(No Model.) 4 Sheets—Sheet 1.
W. S. HILL.
CIRCUIT CONTROLLER FOR ELECTRIC MOTORS.
No. 494,781. Patented Apr. 4, 1893.

WITNESSES
INVENTOR
W. S. Hill
by
Wight, Brown & Crossley
Attys.

(No Model.) 4 Sheets—Sheet 2.

W. S. HILL.
CIRCUIT CONTROLLER FOR ELECTRIC MOTORS.

No. 494,781. Patented Apr. 4, 1893.

WITNESSES
INVENTOR (No Model.) 4 Sheets—Sheet 3.

W. S. HILL.
CIRCUIT CONTROLLER FOR ELECTRIC MOTORS.

No. 494,781. Patented Apr. 4, 1893.

(No Model.)  4 Sheets—Sheet 4.

W. S. HILL.
CIRCUIT CONTROLLER FOR ELECTRIC MOTORS.

No. 494,781.  Patented Apr. 4, 1893.

WITNESSES.  INVENTOR

UNITED STATES PATENT OFFICE.

WARREN S. HILL, OF HYDE PARK, ASSIGNOR TO THE W. S. HILL ELECTRIC COMPANY, OF BOSTON, MASSACHUSETTS.

CIRCUIT-CONTROLLER FOR ELECTRIC MOTORS.

SPECIFICATION forming part of Letters Patent No. 494,781, dated April 4, 1893.

Application filed May 16, 1892. Serial No. 433,130. (No model.)

*To all whom it may concern:*

Be it known that I, WARREN S. HILL, of Hyde Park, in the county of Norfolk and State of Massachusetts, have invented certain new and useful Improvements in Means for Automatically Controlling the Operation of Electric Motors, of which the following is a specification.

This invention has for its object the provision of means for controlling the operation of an electric motor, in such manner that it may be automatically started and stopped under predetermined conditions.

The invention consists of means for controlling the operation of an electric motor, comprising a circuit making and breaking device or switch within the circuit of the motor for maintaining complete the said circuit when the motor is to be operated, and breaking the said circuit when the motor is to be stopped, and a second switch to control the operation of the said circuit making and breaking device or switch, and means as a float in a tank, a thermostat, or other contrivance for automatically moving the second-mentioned switch, all as will be more fully described hereinafter.

Reference is to be had to the annexed drawings, and the letters and figures which are marked thereon, forming a part of this specification, the same letters and figures indicating the same parts or features, as the case may be, wherever they occur.

Figures 1, 2:
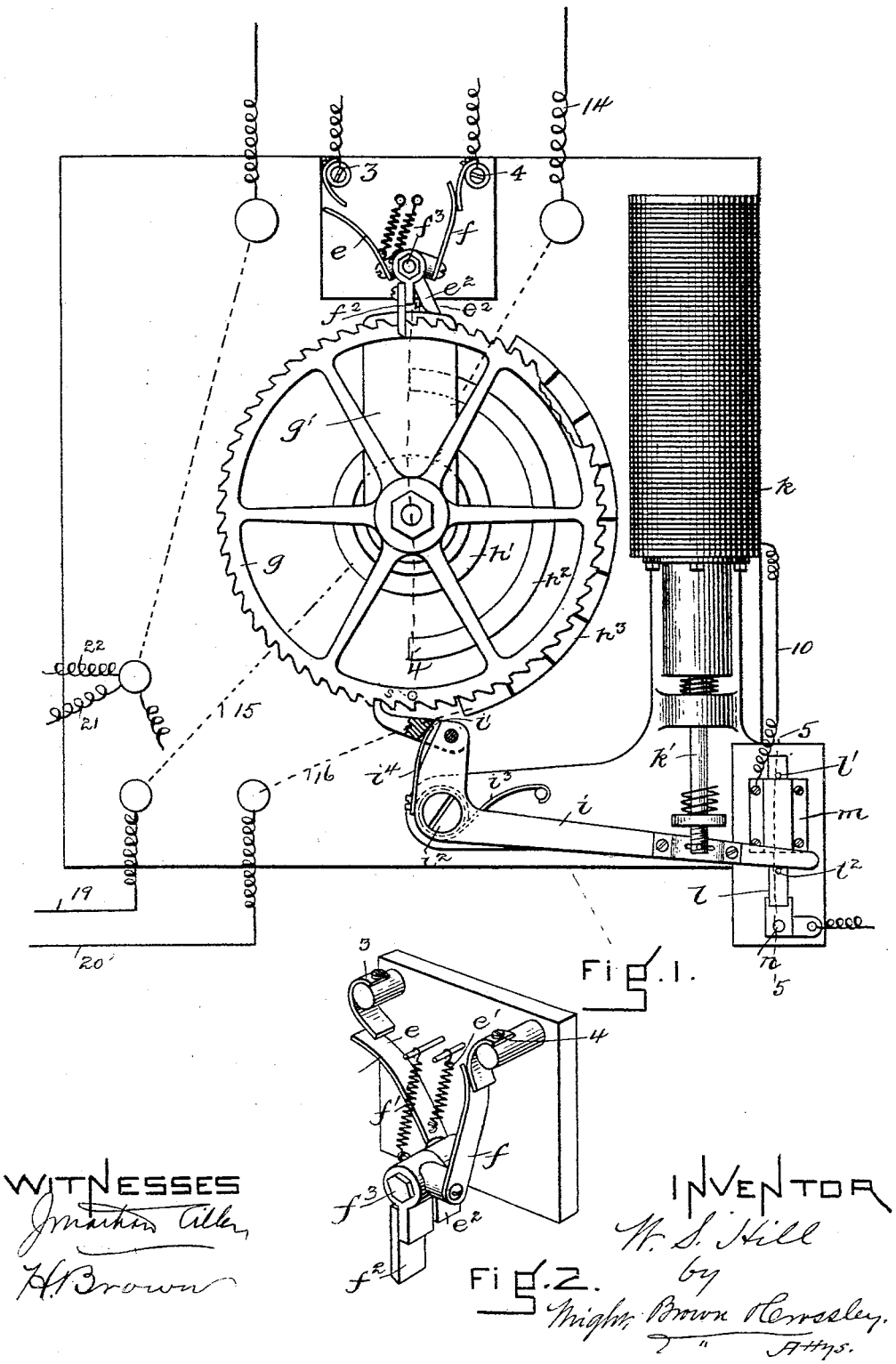
Figure 5:
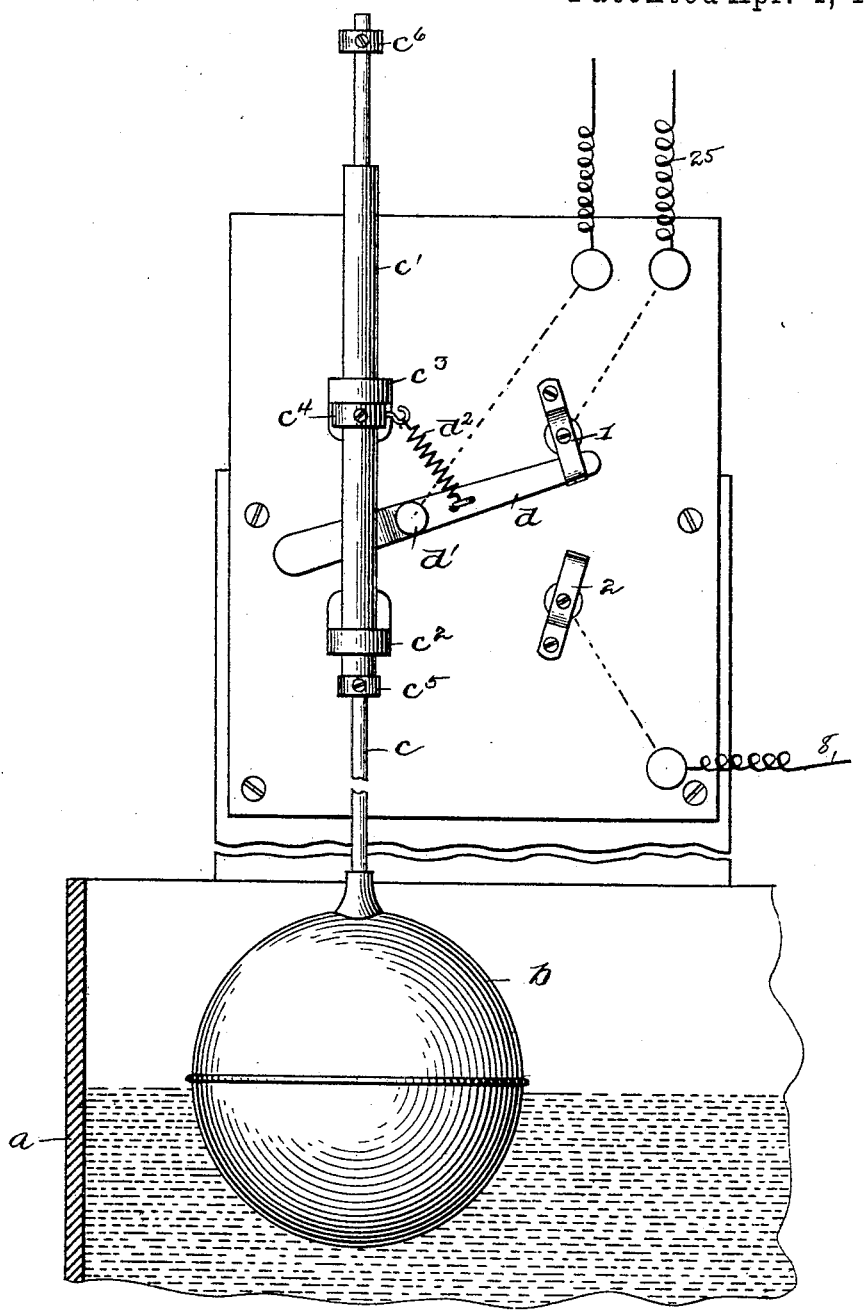
Figures 4, 5:
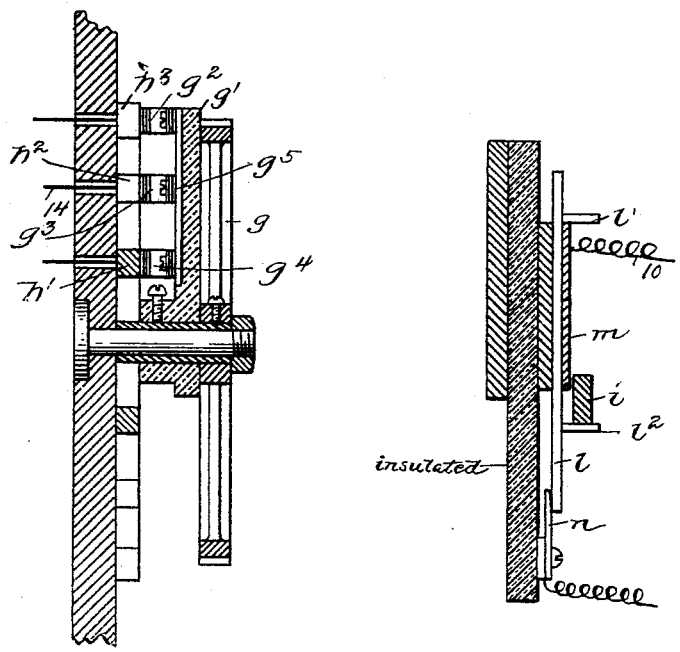
Figure 6:
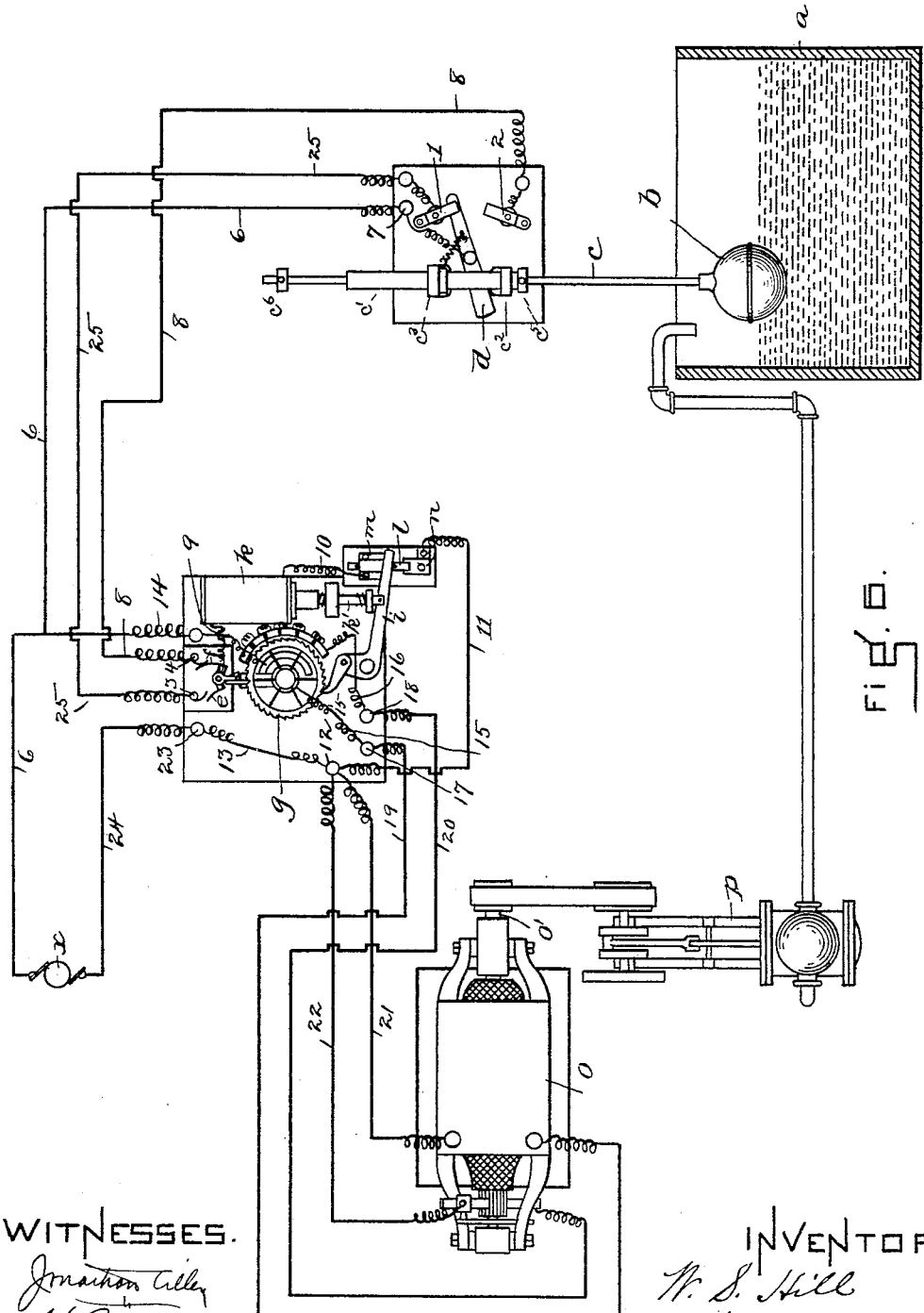

Of the drawings: Figure 1, is a front elevation of the motor switch or circuit making and breaking devices within the circuit of the motor, and the means for operating the said devices. Fig. 2, is a perspective detail view, showing a portion of the means for making and breaking the circuit within said motor switch. Fig. 3, is a side elevation partly in section of the automatically controlled switch for controlling the circuit making and breaking devices before mentioned. Fig. 4, is a sectional view taken on the line 4—4, Fig. 1. Fig. 5, is another sectional view on line 5—5 of Fig. 1 of a portion of the circuit making and breaking mechanism before mentioned which controls the operation of the motor. Fig. 6 is a diagrammatic view of the invention complete as applied to a pump for controlling the supply of water in a tank.

I have herein shown and particularly described my invention with reference to an apparatus for automatically maintaining the proper quantity of water in an elevator, or other tank, but it will appear obvious from the description hereinafter given that the invention is not confined in its use to the apparatus illustrated, but it may be employed in connection with a thermostat, or any other means which may be adapted to operate the electric switch automatically, the last mentioned means constituting no part of my present invention.

In the drawings: $a$ designates a tank, which is provided with a float $b$ to which is attached an upright rod $c$ having collars or stops $c^5 c^6$. A sleeve $c'$ on pipe $c$ serves as a guide for rod $c$ and slides in ears or brackets $c^2 c^3$. As rod $c$ rises and falls, collars $c^5 c^6$ will engage sleeve $c'$ and move the same up and down. A switch lever $d$, pivoted at $d'$, is provided with a spring $d^2$ which is connected to insulated collar $c^4$ secured to sleeve $c'$. As spring $d^2$ is secured to lever $d$ at a point between its fulcrum $d'$ and the free end of the lever, said lever will be oscillated as soon as the collar $c^4$ is above or below the fulcrum point $d'$, in order that when the water has reached the desired level in the tank the lever will be actuated. The throw of lever $d$ is limited by the contact strips 1 and 2, which are terminals of wires 25, and 8 leading to two contacts 3, 4. Beneath these contacts are two strips $e$ and $f$, having downwardly extended arms $e^2$ and $f^2$ and pivotally mounted upon spindle $f^3$. The arms $e^2 f^2$ are engaged alternately by hard rubber piece $g'$ and pin $s$ on ratchet wheel $g$ to move said strips $e$ and $f$ in and out of engagement with contacts 3 and 4. Wheel $g$ revolves over plates $h' h^2 h^3$ and carries hard rubber piece $g'$ to which is secured a plate $g^5$. Brushes $g^2 g^3 g^4$ secured to this plate $g^5$ are adapted to slide upon plates $h' h^2 h^3$. Plate $h^2$ is connected by wire 14 with the positive pole of the generator, and plates $h'$ and $h^3$ with wires 19 and 20 to the field magnet and armature of the motor $o$, from which wires 21, 22 return to the negative pole of the generator. Brushes $g^2$ $g^3$ $g^4$ therefore when in contact with plates $h'$ $h^2$ $h^3$ will complete the motor circuits and thus start the motor. It is necessary that the brushes be in contact with the plates to actuate the motor when the tank is empty and out of contact with said plates when the tank is filled. The rotation of wheel $g$ is accomplished by means of a solenoid $k$ having an arm $k'$ attached to the armature of said solenoid. To the arm $k'$ is fulcrumed one end of a bell crank lever $i$ pivoted at $i^2$ and provided with a spring $i^3$, the tendency of which is to depress the longer arm of the said lever. Pivoted on the lever $i$ is a pawl $i'$ engaging the ratchet teeth of the wheel $g$, and kept in engagement with said wheel by spring $i^4$. The arm of lever $i$ engages pins $l'$ $l^2$ on a sliding contact $l$, and is adapted to make and break the solenoid circuit between pieces $m$ and $n$. When the current is completed through plate $l$ and the coil of solenoid $k$, the armature thereof will be attracted and drawn into the coil by the action of the current, and when the armature has nearly reached the limit of its upward movement, lever $i$ will strike pin $l'$ and drawing plate I upward away from contact $n$, break the circuit and allow the armature to drop, assisted by spring $i^3$ when pin $l^2$ will be struck and the circuit again completed to attract the magnet as before. This action will actuate lever $i$ and pawl $i'$ to revolve wheel $g$. As the solenoid circuit is completed through contacts $e$ and $f$ it will be obvious that at each half-revolution of wheel $g$ said solenoid circuit will be interrupted by rubber $g'$ and pin $s$ and the wheel stopped. The wheel is started in its rotation over plates $h'$ $h^2$ $h^3$ by the completion of the circuit through wire 6, lever $d$ and wire 8, strip $f$ being then in engagement with contact 4. The current is carried to the solenoid by wire 9 thus actuating said solenoid. The wheel will revolve until pin $s$ throws strip $f$ away from contact 4 when the wheel will stop. Strip $e$ is at this time engaging contact 3 and the solenoid will be again energized when lever $d$ is raised to engage strip 1. It is obvious that the first semi-revolution of the wheel and brushes will complete the motor circuits, thus starting the pump. It must also be understood that when the wheel completes the first semi-revolution and comes to rest, the brushes will still be in contact with the plates of the motor circuit and thus maintain said circuit and continue the action of the pump, until the float raises lever $d$ into contact with strip 1, when the next semi-revolution of the wheel will take place and the motor circuits be interrupted. When the wheel and brushes come to rest at the end of the rotation, said brushes will not complete the motor circuit, and the motor will not be started again until the wheel has begun its next trip.

The operation of the machine will next be described. Let us suppose the water to be exhausted from the tank. The float $b$ will carry lever $d$ down into engagement with contact 2, and the current will be completed from generator $x$ through wire 6, post 7, lever $d$, contact 2, wire 8, contact strip $f$, wire 9, through the coils of the solenoid $k$, wire 10, guide $m$, plate $l$, contact $n$, wire 11, post 12, wire 13 to the generator. The solenoid actuated by the current revolves wheel $g$ carrying the brushes $g^2$ $g^3$ $g^4$ (Fig. 4) in contact with plates $h'$ $h^2$ $h^3$ and motor circuits are completed from the generator through wire 14, plate $h^2$, brushes $g^2$ $g^3$ $g^4$, plates $h'$ $h^3$, wires 15, 16, posts 17, 18, wires 19, 20, motor $o$, wires 21, 22, post 12, wire 13, post 23, wire 24, to the generator, thus setting in motion motor $o$ and pump $p$ to fill the tank. The wheel $g$ will continue to revolve until pin $s$ strikes arm $f^2$ of contact strip $f$ when the solenoid circuit will be broken, the brushes, however, continuing to rest in contact with the plates $h'$ $h^2$ $h^3$ and thus maintaining the motor circuits and continuing the action of the pump. As soon as the water has risen to the proper level in the tank, float $b$ rising thereout will shift lever $d$ into engagement with contact 1 when the solenoid will again be caused to act by a current from generator $x$ through wire 6, post 7, lever $d$, contact 1, wire 25, post 3, contact $e$ into the solenoid and back to the generator as before. Wheel $g$ will, therefore, be caused to revolve, carrying the brushes away from the plates, and stopping the motor. The wheel will continue to revolve until rubber $g'$ strikes contact $e$ and breaks the solenoid circuit. The wheel will now be in position to begin its next half revolution to energize the motor when the tank is again emptied.

As before stated my invention is not limited in its use to elevator tanks, but may be employed in connection with any device which by expansion and contraction, or by movement due to heat and cold, pressure, gravity, or other causes, is adapted to automatically move the lever $d$, or other form of switch.

Having thus described the nature of my invention and explained a way of constructing and using the same, though without attempting to set forth all of the forms in which it may be made or all of the modes of its employment, I declare that what I claim is—

1. The combination, with an elevator tank, a pump, and a motor, connected with said pump, of a revoluble switch in the circuit of said motor, and having a toothed wheel, a pawl engaging the teeth of said wheel, a solenoid having its core connected with said pawl to rotate the wheel and switch, and means whereby the circuit of said solenoid is opened and closed, substantially as described.

2. The combination, with an elevator tank, a pump for supplying water to said tank, and an electric motor for actuating the pump, of an electro magnet connected with said tank, and electric connections between said motor and magnet and consisting of a toothed wheel carrying switch contacts, and a pawl operated by the armature of said magnet whereby the rise and fall of the water will operate to energize and de-energize said magnet, and by the consequent reciprocation of the armature control the action of the motor and the flow of water from the pump, as set forth.

3. The combination of the revoluble switch $g$, contact strips $e$ and $f$, solenoid $k$, lever $i$, pawl $i'$, float $b$, rod $c$, switch $d$ connected with the generator, and contacts 1 and 2 connected with said contact strips $e$ and $f$, substantially as described.

4. The combination of switch $g$, plates $h'$ $h^2$ $h^3$ the plate $h^2$ connected with the generator, and plates $h'$ $h^3$ with the motor $o$, brushes in said switch adapted to open and close the motor circuit and solenoid $k$, whereby said switch is revolved at stated intervals, substantially as set forth.

In testimony whereof I have signed my name to this specification, in the presence of two subscribing witnesses, this 19th day of April, A. D. 1892.

WARREN S. HILL.

Witnesses:
GEO. H. POOR,
LOUIS. E. HILL.